United States Patent [19]

Verardi et al.

[11] Patent Number: 6,001,469

[45] Date of Patent: *Dec. 14, 1999

[54] THERMOSETTABLE PRIMER AND TOPCOAT FOR PLASTICS, A METHOD FOR APPLYING AND COATED PLASTIC ARTICLES

[75] Inventors: Christopher A. Verardi, Pittsburgh; Lawrence D. Meyers, Allison Park; William A. Humphrey, Pittsburgh, all of Pa.

[73] Assignee: PPG Industries Ohio, Inc., Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,446

[22] Filed: Mar. 28, 1996

[51] Int. Cl.$^6$ .................................................. B32B 27/00
[52] U.S. Cl. ........................ 428/333; 428/334; 428/411.1; 428/423.1; 428/423.3; 428/423.7; 428/480; 428/481; 428/483; 428/500; 428/516; 428/521; 428/522; 428/623
[58] Field of Search ...................................... 524/501, 502, 524/507, 512, 513, 500, 525, 539; 428/333, 334, 411.1, 423.1, 423.3, 423.7, 480, 481, 483, 500, 516, 521, 522, 523

[56] References Cited

U.S. PATENT DOCUMENTS

| | | | |
|---|---|---|---|
| Re. 27,145 | 6/1971 | Jones | 260/880 |
| 3,652,732 | 3/1972 | Makowski et al. | 260/880 B |
| 3,979,547 | 9/1976 | Roberts, Jr. et al. | 428/423 |
| 4,020,125 | 4/1977 | Suzuki et al. | 260/859 R |
| 4,039,593 | 8/1977 | Kamienski et al. | 260/635 |
| 4,046,729 | 9/1977 | Scriven et al. | 260/29.2 |
| 4,066,591 | 1/1978 | Scriven et al. | 260/29.2 TN |
| 4,093,593 | 6/1978 | Go | 260/45.85 P |
| 4,147,679 | 4/1979 | Scriven et al. | 260/29.2 |
| 4,147,688 | 4/1979 | Makhlouf et al. | 260/33.6 |
| 4,286,019 | 8/1981 | Fahey | 428/391 |
| 4,403,003 | 9/1983 | Backhouse | 427/408 |
| 4,403,085 | 9/1983 | Christenson et al. | 528/45 |
| 4,518,753 | 5/1985 | Richards et al. | 526/177 |
| 4,764,430 | 8/1988 | Blackburn et al. | 428/413 |
| 4,866,120 | 9/1989 | Rudnick et al. | 524/849 |
| 4,997,882 | 3/1991 | Martz et al. | 525/65 |
| 5,039,755 | 8/1991 | Chamberlain et al. | 525/338 |
| 5,071,904 | 12/1991 | Martin et al. | 524/458 |
| 5,096,954 | 3/1992 | Yamada et al. | 524/385 |
| 5,115,007 | 5/1992 | Chihara et al. | 524/267 |
| 5,221,707 | 6/1993 | Chihara et al. | 524/267 |
| 5,319,032 | 6/1994 | Martz et al. | 525/301 |
| 5,330,627 | 7/1994 | Grutter et al. | 204/181.4 |
| 5,356,973 | 10/1994 | Taljan et al. | 524/314 |
| 5,358,981 | 10/1994 | Southwick | 523/402 |
| 5,376,745 | 12/1994 | Handlin, Jr. et al. | 526/178 |
| 5,378,761 | 1/1995 | St. Clair | 525/111 |
| 5,397,602 | 3/1995 | Martz et al. | 427/343.5 |
| 5,405,911 | 4/1995 | Handlin, Jr. et al. | 525/139 |
| 5,416,168 | 5/1995 | Willis et al. | 525/333.2 |
| 5,436,079 | 7/1995 | Brugel | 428/483 |
| 5,446,104 | 8/1995 | Handlin, Jr. et al. | 525/314 |
| 5,459,200 | 10/1995 | St. Clair | 525/131 |
| 5,486,570 | 1/1996 | St. Clair | 525/123 |
| 5,500,481 | 3/1996 | St. Clair | 525/92 K |
| 5,554,691 | 9/1996 | St. Clair | 525/111 |
| 5,594,072 | 1/1997 | Handlin, Jr. et al. | 525/314 |
| 5,612,407 | 3/1997 | Southwick | 524/571 |
| 5,721,317 | 2/1998 | St. Clair et al. | 525/98 |
| 5,721,318 | 2/1998 | St. Clair et al. | 525/99 |
| 5,804,657 | 9/1998 | St. Clair et al. | 525/99 |
| 5,863,646 | 1/1999 | Verardi et al. | 428/323 |

FOREIGN PATENT DOCUMENTS

| | | |
|---|---|---|
| 601665 | 6/1994 | European Pat. Off. . |
| 0 698 638 | 2/1996 | European Pat. Off. . |
| 0698638B1 | 1/1998 | European Pat. Off. . |
| WO96/11238 | 4/1996 | WIPO . |
| WO96/11241 | 4/1996 | WIPO . |

OTHER PUBLICATIONS

"Are the Low Viscosity Functionalized Olefinic Polymers Feasible as Components in Coatings to Adhere to Untreated TPO Substrates?" by Michelle Mikulec of Ford Motor Co., Oct. 28–30, 1996.

"Coating Resins Based on Melamine Cured Polyolefin Diol" by D. St. Clair, Technical paper presented at TPO's in Automotive '96 Conference, Oct. 28–30, 1996, Novi, Michigan.

Encyclopedia of Chemical Technology, Supplement vol., 2nd ed., 1971, pp. 889–909, John Wiley & Son, Inc.

U.S. Patent Application Serial No. 08/622,194, filed Mar. 25, 1996.

*Primary Examiner*—Judy M. Reddick
*Attorney, Agent, or Firm*—Kenneth J. Stachel; Ann Marie Cannoni

[57] ABSTRACT

A liquid coating composition has: from about 5 to 45 percent by weight of resin solids of substantially saturated polyhydroxylated polydiene polymer having terminal hydroxyl groups; from about 10 to 50 percent by weight of resin solids of crosslinking material; from about 5 to 85 percent by weight of resin solids of polymeric film forming resin; and solvent. The solvent has at least 5 percent by weight of the solvent composition consisting of water; and/or at least one organic solvent having Hansen Solubility Parameters $Sp_o$ from about 8.0 to 10.0 $(cal/cm^3)^{1/2}$, $SP_h$ from about 0.5 to 5.0 $(cal/cm^3)^{1/2}$, and $Sp_p$ from about 0.2 to 3.0 $(cal/cm^3)^{1/2}$; and/or mixtures thereof. The liquid coating composition can be solvent-based or aqueous-based and can additionally contain at least one pigment. The liquid coating composition can be coated directly onto thermoplastic and thermosetting plastic substrates, such as TPO and RIM, without the aid of flame or corona pretreatment, or the use of an adhesion promoter. A method of coating plastic substrates comprising the use of the liquid coating composition and a plastic article coated with the liquid coating composition are also disclosed.

30 Claims, No Drawings

THERMOSETTABLE PRIMER AND TOPCOAT FOR PLASTICS, A METHOD FOR APPLYING AND COATED PLASTIC ARTICLES

BACKGROUND OF THE INVENTION

The present invention relates to coating compositions for thermoplastic and thermosetting plastic materials, a method for applying the coating compositions onto plastic substrates, and the coated plastic articles.

Plastic materials such as thermoplastic olefin (TPO) and reaction injected molding urethane (RIM) have been developed which are useful in many applications, such as automobile parts and accessories, containers, household appliances, and other commercial items. It is often desirable to coat articles made from such plastic materials with organic coating compositions to decorate them or to protect the plastic materials from degradation when exposed to atmospheric weathering conditions such as sunlight, moisture, heat and cold. To achieve longer lasting and more durable parts, it is necessary for the coatings to be tightly adhered to the surface of the plastic.

Plastic substrates made from a variety of thermoplastic and thermosetting plastic materials have widely varying surface properties including surface tension, roughness, and flexibility, which make it difficult to achieve adequate adhesion of the organic coatings to such materials, particularly after aging or environmental exposure of the plastic materials. It is well known that to properly adhere coatings to some plastic materials, the use of an adhesion promoter or tie coat can be used. The application of an adhesion promoter or tie coat is normally an added step in the coating process where the adhesion promoter is usually applied in a thin layer, normally about 0.25 mils (6.35 microns). Typically, adhesion promoters used on TPO plastic surfaces contain chlorinated polyolefins, some examples of which are described in U.S. Pat. Nos. 4,997,882; 5,319,032; and 5,397,602. Additionally, flame or corona pretreatment steps can be used to facilitate adequate adhesion of organic coatings to some plastic substrates.

The use of adhesion promoters and corona pretreatments in a coating system used to coat plastic substrates adds complexity and cost to the system. The application of an adhesion promoter usually entails coating the plastic substrate with the promoter, followed by some drying or curing time which increases the time of the entire coating process, and will usually necessitate additional work space. Accordingly, coating compositions which exhibit excellent adhesion directly to plastic materials such as TPO and RIM without the use of adhesion promoters or tie coats are desirable.

It is an object of the present invention to provide a coating composition for use on and a method of coating thermoplastic and thermosetting plastic materials so that the coating has adhesion directly to the plastic substrate without the aid of flame or corona pretreatment, or the use of an adhesion promoter or tie coat and to provide the coated plastic materials.

SUMMARY OF THE INVENTION

In accordance with the present invention, there is provided a coating composition for thermoplastic and thermosetting plastic materials, such as TPO and RIM. The coating composition comprises from about 5 to 45 percent by weight of resin solids of substantially saturated polyhydroxylated polydiene polymer, from about 10 to 50 percent by weight of resin solids of crosslinking material, from about 5 to 85 percent by weight of resin solids of polymeric film forming resin, and solvent wherein at least 5 percent by weight of the solvent composition can be water or at least one organic solvent having a Hansen Solubility Parameters $Sp_o$ from about 8.0 to 10.0 $(cal/cm^3)^{1/2}$, $Sp_h$ from about 0.5 to 5.0 $(cal/cm^3)^{1/2}$, and $Sp_p$ from about 0.2 to 3.0 $(cal/cm^3)^{1/2}$, or mixtures thereof. Additionally, the coating composition can contain pigments.

Also provided are thermoplastic and thermosetting plastic articles coated with from about 0.01 to 5.0 mils (0.254 to 127 microns ($\mu$)) of the claimed coating composition of the present invention directly onto the plastic article without the aid of flame or corona pretreatment, or the use of an adhesion promoter or tie coat.

Also provided is a method of applying from 0.01 to 5.0 mils (0.254 to 127$\mu$) of the claimed coating composition directly onto thermoplastic and thermosetting plastic substrates.

DETAILED DESCRIPTION OF THE INVENTION

As used herein, the term "plastic" is intended to include any of the thermoplastic or thermosetting synthetic nonconductive materials commonly used in injection or reaction molding, sheet molding, or other similar process whereby parts are formed.

The coating composition of the present invention is suitable for use as a primer applied directly to a plastic substrate, a colored topcoat applied directly to a plastic substrate, or as a colored basecoat applied directly to a plastic substrate that is subsequently topcoated with a clear topcoat in a basecoat-clearcoat coating composite. By "direct to a plastic substrate" is meant that no flame or corona pretreatment, or adhesion promoter or tie coat is needed prior to the application of the claimed coating composition.

Polyhydroxylated polydiene polymers made using isoprene or butadiene as described in U.S. Pat. Nos. 5,486,570 and 5,376,745, which are substantially saturated, are suitable for use in the present invention. By the term "substantially saturated", it is meant that the polyhydroxylated polydiene polymer has been hydrogenated such that at least 90 percent and preferably at least 95 percent of the carbon to carbon double bonds of the polyhydroxylated polydiene polymer are saturated. Polyhydroxylated polydiene polymers of this type generally have an hydroxyl equivalent weight of between 500 and 20,000. Preferably, the saturated polyhydroxylated polydiene polymer is a dihydroxy polybutadiene which contains two terminal hydroxyl groups, one at each end of the polymer, and having an hydroxyl equivalent weight of about 1,500 to 3000.

The substantially saturated polyhydroxylated polydiene polymers are known as synthesized products of anionic polymerization of conjugated diene hydrocarbons, such as butadiene or isoprene, with lithium initiators. The process steps are known as described in U.S. Pat. Nos. 4,039,593; Re. U.S. Pat. Nos. 27,145; and 5,376,745, all of which are hereby incorporated by reference for their disclosure of preparing polyhydroxylated polydiene polymers. Such polymers have been made with di-lithium initiator, such as the compound formed by reaction of two moles of sec-butyllithium with one mole of diisopropylbenzene. Such a polymerization of butadiene has been performed in a solvent composed of 90 percent by weight cyclohexane and 10 percent by weight diethylether. The molar ratio of diinitiator to monomer determines the molecular weight of the polymer. The polymer is capped with two moles of ethylene oxide and terminated with two moles of methanol to produce the dihydroxy polybutadiene. The hydroxylated polydiene polymer is hydrogenated where substantially all of the carbon to carbon double bonds become saturated. Hydrogenation has been performed by those skilled in the art by established processes including hydrogenation in the presence of such catalysts as Raney Nickel, nobel metals such as platinum and the like, soluble transition metal catalysts and titanium catalysts as in U.S. Pat. No. 5,039,755. Suitable polyhydroxylated polydienes are those available from Shell under the trade designation of KRATON LIQUID™ POLYMERS, HPVM 2200 series products.

Polyhydroxylated polydiene polymers used in the claimed coating composition also have been used in polyurethane sealants and adhesives as described in U.S. Pat. No. 5,486,570, hereby incorporated by reference. However, the present invention uses polyhydroxylated polydiene polymers in a solvent-based or water-based coating composition which has adhesion when applied directly to thermoplastic and thermosetting plastic material substrates.

When the claimed coating composition is aqueous-based, the saturated polyhydroxylated polydiene polymer can be dispersed in water by any technique known in the art. One technique described in European Patent Application No. 601,665 includes heating the polybutadiene polymer until its viscosity is less than 3,000 centipoise, adding a mixture of water and surfactant under high speed agitation, cooling the dispersion and then optionally subjecting the dispersion to turbulent flow and/or cavitation in an apparatus such as a MICROFLUIDIZER available from Microfluidics Corporation, Newton, Mass.

The polymeric film-forming resin can be one or a combination of polymers known in the art of polymer chemistry such as acrylic polymers and copolymers such as acrylic polyol polymers, polyacrylourethanes; polyester polymers and copolymers such as polyester urethanes, polyester polyol polymers; polyurethane polymers and copolymers such as polyetherurethanes and the like; and an aqueous dispersion of polymeric microparticles having acrylic functionality. These polymers generally have active hydrogens either in their chemical structure and/or from functional groups that can be present on the polymers such as hydroxyl, carboxyl, amido, primary and/or secondary amino, epoxy, thiol, carbamate and the like. By the term "film forming", it is meant that the resinous or polymeric material upon curing at ambient or elevated temperature forms a self-supporting continuous film on at least a horizontal surface and even includes polymeric materials that upon removal of any solvents or carriers present in the polymer emulsion, dispersion, suspension or solution, can coalesce to form a film on at least a horizontal surface and is capable of curing into a continuous film. The polymeric film-forming resin is present in the present invention from about 5 to 85 percent by weight of resin solids, preferably from about 15 to 75 percent by weight of resin solids.

The acrylic polymers are typically copolymers of one or more alkyl esters of acrylic acid or methacrylic acid having from 1 to 20 carbon atoms in the alkyl group optionally together with one or more other polymerizable ethylenically unsaturated monomers. These polymers can be either thermoplastic or thermosetting (crosslinking). Suitable alkyl esters of acrylic acid or methacrylic acid include methyl methacrylate, isobutyl methacrylate, alpha-methyl styrene dimer, ethyl methacrylate, n-butyl methacrylate, ethyl acrylate, n-butyl acrylate, 2-ethylhexyl acrylate, and 2-ethylhexyl methacrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

When the acrylic polymer is of the crosslinking type, suitable active hydrogen functional monomers are used in addition to the other acrylic monomers mentioned above and include, for example, acrylic acid, methacrylic acid, hydroxyethyl acrylate, hydroxyethyl methacrylate, hydroxypropyl acrylate, and hydroxypropyl methacrylate. The coating composition in such cases can contain a crosslinking agent capable of reacting with the active hydrogen groups contributed to the polymer by the functional monomers such as aminoplast resins which include condensates of an amine or an amide with such as urea, melamine, or benzoguanamine reacted with formaldehyde or a lower alkyl ether of such condensate in which the alkyl groups contain from 1 to 4 carbon atoms. Other crosslinking agents such as polyisocyanates including blocked polyisocyanates can also be used. Also, the acrylic polymer can be prepared with N-(alkoxymethyl)acrylamide monomer(s) and N-(alkoxymethyl)methacrylamide monomer(s) which result in an acrylic polymer capable of self-crosslinking without the presence of crosslinking agents such as those described above.

The acrylic polymer can be prepared by free radical initiated solution polymerization techniques in the presence of suitable free radical initiators such as organic peroxides or azo compounds, for example, benzoyl peroxide or 2,2'-azobis(2-methylbutane nitrile). The polymerization can be carried out in an organic solvent in which the monomers and resultant polymer are soluble. Suitable solvents include aromatic solvents such as xylene and toluene and ketones such as methyl amyl ketone. Alternately, the acrylic polymer can be prepared by aqueous emulsion or dispersion polymerization techniques well known to those skilled in the art.

The polymeric film-forming resin of the claimed coating composition can be a polyester polymer (including alkyds). Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the polycarboxylic acids such as anhydrides where they exist or lower alkyl esters of the polycarboxylic acids such as the methyl esters may be used.

Where it is desired to produce air-drying alkyd resins from the polyester polymer, suitable drying oil fatty acids can be used to modify the polyester by methods well known to those skilled in the art, and include those derived from linseed oil, soya bean oil, tall oil, dehydrated castor oil or tung oil. The polyester polymers including the alkyd polymers can be thermoplastic or thermosetting. A thermosetting polyester generally contains a portion of free hydroxyl and/or carboxyl groups which are available for crosslinking reaction with a crosslinking agent. Suitable crosslinking agents are the amine or amide-aldehyde condensates or the polyisocyanate curing agents as mentioned above.

Polyurethanes can also be used as the polymeric film former in the claimed coating composition. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis(cyclohexyl isocyanate). Examples of suitable higher polyisocyanates are 1,2,4-benzene triisocyanate and polymethylene polyphenyl isocyanate.

The polymeric film-forming resin, when dispersed in an aqueous medium, can be an aqueous dispersion of polymeric microparticles. Preferably, the microparticles are crosslinked. A wide range of crosslinked polymeric microparticle dispersions are suitable for use herein including those described in U.S. Pat. No. 4,403,003 and references cited therein. The microparticles can contain greater than 30 percent by weight based on the microparticles of a substantially hydrophobic condensation polymer having a molecular weight of greater than 300. The substantially hydrophobic polymer can be essentially free of repeating acrylic or vinyl units in the backbone. Preferably, the microparticles contain greater than 40 percent by weight of the substantially hydrophobic polymer, more preferably greater than 50 percent. By "substantially hydrophobic" is meant that upon mixing a sample of polymer with an organic component and water, a majority of the polymer is in the organic phase and a separate aqueous phase is observed. Examples of suitable condensation polymers include polyesters, polyurethanes, polyethers and alkyds.

It should be understood that the substantially hydrophobic polymer having a molecular weight greater than 300 is adapted to be chemically bound into the cured coating composition; that is, the polymer is reactive in the sense that it contains functional groups such as hydroxyl groups which are capable of coreacting, for example, with a crosslinking agent such as a melamine formaldehyde resin which may be present in the coating composition or alternatively with other film forming resins which also may be utilized. Preferably, the polymer has a molecular weight greater than 500, more preferably greater than 800. Typically, the molecular weight ranges from about 300 to about 10,000, more usually from about 300 to about 2,000. By "essentially free of repeating acrylic or vinyl units" is meant that the polymer need not be prepared from typical free radically polymerizable monomers such as acrylates, styrene and the like. A detailed description of the preparation of an aqueous dispersion of polymeric microparticles is contained in U.S. Pat. No. 5,356,973, columns 6 to 12, which is incorporated by reference herein.

Most of the polymers prepared as described above are organic solvent-based polymers, although acrylic polymers can be prepared via aqueous emulsion polymerization techniques generally known to those skilled in the art. Also, water-based polyurethanes such as those prepared in accordance with U.S. Pat. No. 4,147,679 can be used as the polymeric film-forming resin in the present invention. Preferably, when the claimed coating composition is aqueous-based, the film-forming resin is polymeric microparticles having acrylic functionality.

The crosslinking material of the claimed coating composition can be one or more aminoplast resins or one or more isocyanates, including mono-, di-, and polyisocyanates as are generally known to those skilled in the art. Generally, the aminoplast resin can be present in the coating composition from about 5 to 60 percent, preferably from about 15 to 50 percent, more preferably from about 30 to 50 percent by weight of resin solids. When isocyanates are used as a crosslinker in the claimed coating composition, a stoichiometric amount can be used such that the NCO:OH ratio equals about 0.8 to 1.5.

Aminoplast resins are based on the addition products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted melamines. Some examples of such compounds are N,N'-dimethyl urea, benzourea, dicyandiamide, formaguanamine, acetoguanamine, glycoluril, aniline, 2-chloro-4,6-diamino-1,3,5-triazine, and the like.

The aldehyde can be formaldehyde in aqueous or alcoholic form as the semi-acetate. Paraformaldehyde, for example, is hydrolyzed or depolymerized in the presence of dilute acids or bases in warm water or alcohols. While the aldehyde employed is most often formaldehyde, other similar condensation products can be made from other aldehydes, such as acetaldehyde, isobutyraldehyde, crotonaldehyde, acrolein, benzaldehyde, furfuryl, glyoxal and the like.

Alkylation of the aminoplast crosslinking agent includes, for example, methylated and/or butylated or isobutylated melamine formaldehyde resin that is substantially monomeric or polymeric with varying degrees of polymerization such as of about 3 to around 1–2. The aminoplast resins contain methylol or similar alkylol groups, and in most instances, at least a portion of these alkylol groups are etherified by a reaction with an alcohol to provide organic solvent soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as Cellosolves and Carbitols, and halogen substituted or other substituted alcohols, such as 3-chloropropanol or butoxyethanol. Usually, the preferred etherification is methylolation with formaldehyde with the addition of weak bases. Preferably, 3 to 6 methanol groups per molecule of melamine are reacted. Melamine formaldehyde resins with a mixture of etherification can also be used. Generally, these can range from mostly methylated groups with a minor amount of the butylated groups to a substantial amount of the butylated groups with a minor amount of the methylated groups. Such crosslinking agents typically have a number average molecular weight of about 300 to 600. In addition to the melamine formaldehyde having a mixture of the ethylated groups in the condensate itself, combinations of a methyl etherified methylol melamine resin and of a butyl etherified methylol melamine resin can also be used. Aminoplast resins are commercially available from American Cyanamid Co. under the trademark CYMEL and from Monsanto Chemical Co. under the trademark RESIMENE.

Suitable monoisocyanates include cyclohexyl isocyanate, phenyl isocyanate, and toluene isocyanate. The polyisocyanate can be an aliphatic, cycloaliphatic or aromatic polyisocyanate, or mixtures thereof. Diisocyanates are preferred, although higher polyisocyanates such as triisocyanates can be used either in place of or in combination with diisocyanates. Examples of the aliphatic diisocyanates are trimethylene, tetramethylene, tetramethylxylylene, pentamethylene, hexamethylene, 1,2-propylene, 1,2-butylene, 2,3-butylene, and 1,3-butylene diisocyanates. Also suitable are cycloalkylene compounds such as 1,3-cyclopentane and isophorone diisocyanates; aromatic compounds such as m-phenylene, p-phenylene and diphenylmethane4,4-diisocyanate; aliphatic-aromatic compounds such as 2,4- or 2,6-tolulene diisocyanates and 1,4-xylylene diisocyanate; nuclear-substituted aromatic compounds such as dianisidine diisocyanate and 4,4-diphenylether diisocyanate; triisocyanates such as triphenylmethane-4,4,4-triisocyanate, and 1,3,5-triisocyanatobenzene; tetraisocyanates such as 4,4-dimethyldiphenylmethane-2,2,5,5-tetraisocyanate; polymerized polyisocyanates such as tolulene diisocyanate dimers and trimers; and the like. Isothiocyanates corresponding to the above-described isocyanates, where they exist, can be employed as well as mixtures of materials containing both isocyanate and isothiocyanate groups. Isocyanates are commercially available from Bayer USA, Inc. under the trademarks MONDUR and DESMODUR.

The coating composition of the present invention can also contain pigments to give it color. Compositions containing metallic flake pigmentation are especially useful for the production of so-called "glamour metallic" finishes chiefly upon the surface of automobile bodies and parts. Proper orientation of the metallic pigments results in a lustrous shiny appearance with excellent flop, distinctness of image and high gloss. Suitable metallic pigments include in particular aluminum flakes, bronze flakes, coated mica, nickel flakes, tin flakes, silver flakes, copper flakes, or combinations thereof.

Besides the metallic pigments, the coating compositions of the present invention can contain non-metallic color pigments conventionally used in coating compositions including inorganic pigments such as titanium dioxide, talc, mica, iron oxides, lead oxides, chromium oxides, lead chromate and carbon black, including conductive carbon black, and organic pigments such as phthalocyanine blue and phthalocyanine green, as well as a variety of other color pigments. In general, the total amount of pigments incorporated into the coating composition is in amounts of from about 1 to about 80 percent by weight based on weight of the resin solids of the composition. The metallic pigment is employed in amounts of about 0.5 to 25 percent by weight of the aforesaid aggregate weight. The specific pigment to binder ratio can vary widely so long as it provides the requisite hiding at desired film thickness and application solids.

The solubility parameter of a material is the measurement of the square root of the energy of vaporization per molar volume of that material. The unit of measure is $(cal/cm^3)^{1/2}$ and is sometimes called a "hildebrand." The Hansen Solubility Parameter has three components, a dispersive component, $SP_d$; a polar component, $Sp_p$; and a hydrogen bonding component, $Sp_h$. The square root of the sum of the squares of the three components is the overall solubility parameter, $Sp_O$. A description of the Hansen Solubility Parameters can be found on pages 889 to 909 of the ENCYCLOPEDIA OF CHEMICAL TECHNOLOGY, Supplement Volume, 2nd ed., 1971, John Wiley & Sons, Inc. At least 5 percent of the solvent content of the coating composition can be either water or an organic solvent having Hansen Solubility Parameters $Sp_o$ from about 8.0 to 10.0 $(cal/cm^3)^{1/2}$, $Sp_h$ from about 0.5 to 5.0 $(cal/cm^{3 1/2}$, and $Sp_p$ from about 0.2 to 3.0 $(cal/cm^3)^{1/2}$, for mixtures thereof. It should be noted, however, that cosolvents that are outside the Hansen Solubility Parameter ranges can be used in the coating composition as long as at least 5 percent by weight of the solvent content of the coating composition is either water or an organic solvent within the Hansen Solubility Parameters listed above, or mixtures thereof.

Suitable solvents for use in the coating composition include aliphatic solvents such as hexane, heptane, naptha, and mineral spirits; aromatic solvents such as toluene, xylene, and SOLVESSO 100; alcohols such as ethyl, methyl, n-propyl, isopropyl, n-butyl, isobutyl and amyl alcohol, and m-pyrol; esters such as ethyl acetate, n-butyl acetate, isobutyl acetate, isobutyl isobutyrate, and oxohexyl acetate; ketones such as acetone, methyl ethyl ketone, methyl isobutyl ketone, diisobutyl ketone, methyl n-amyl ketone, and isophorone. Additional solvents include glycol ethers and glycol ether esters such as ethylene glycol monobutyl ether, diethylene glycol monobutyl ether, ethylene glycol monohexyl ether, propylene glycol monomethyl ether, propylene glycol monopropyl ether, ethylene glycol monobutyl ether acetate, propylene glycol monomethyl ether acetate, and dipropylene glycol monomethyl ether acetate.

If desired, the coating composition of the present invention can additionally contain other materials well known in the art of formulated surface coatings. These would include: surfactants, flow control agents, thixotropic agents, fillers, anti-gassing agents, organic co-solvents, additional film-forming polymers, polymeric microparticles, catalysts and other customary auxiliaries. These materials can constitute up to 40 percent by weight of the total weight of the coating composition.

The coating composition of the present invention can be made as the solvent-borne or water-borne composition generally utilizing techniques known to those skilled in the art for making solvent- or water-borne compositions. Usually, this includes mixing together in any order under agitation at ambient conditions: the solvent, the saturated polyhydroxylated polydiene polymer, the film-forming resin, the crosslinking resin, and any pigment and/or other additives used in the art of formulated surface coatings. As noted above for preparing the water-borne composition, microfluidization can be used or alternatively the components can be added in a manner and order under agitation in a suitable container in an order to obtain the proper oil-in-water inversion.

The percent by weight solids content of the claimed coating composition can vary from about 20 to 80 percent. Preferably, when the coating composition is solvent-based, the percent by weight of solids is about 30 to 70 percent. When the claimed coating composition is an aqueous material, preferably the percent by weight of solids is about 20 to 50 percent. Also, when the coating composition is aqueous based, the pH can range from about 7 to 11, preferably from about 7.5 to 9. The viscosity, as measured with a #4 Ford Cup, of the coating composition can range from about 12 to 40 seconds, preferably from about 15 to 35 seconds.

The coating composition of the present invention is useful particularly as coating compositions for various thermoplastic and thermosetting plastic substrates, for example, thermoplastic olefins including polyethylene and polypropylene substrates; reaction injected molding urethane (RIM) substrates; and EPDM rubber substrates.

The claimed coating composition can be applied by conventional means including brushing, dipping, flow coating, spraying and the like, but they are most often applied by spraying. Conventionally known techniques and equipment for spraying and electrostatic spraying and either manual or automatic methods can be used. Although conventional application means are employed, the coating composition is deposited directly onto the surface of the plastic substrate without the need of an adhesion promoter or tie coat layer.

During application of the coating composition to the plastic substrate, a film of the coating composition is formed on the substrate. Typically, the film thickness will be about 0.01 to 5.0 mils (0.254 to 127$\mu$), preferably about 0.1 to 3.0 mils (25.4 to 76.2$\mu$). When the claimed coating composition is used as a primer, preferably the dry film thickness is about 0.5 to 20 mils (12.7 to 50.8$\mu$); when used as a basecoat, preferably the dry film thickness is about 0.2 to 1.5 mils (5.1 to 38.1$\mu$); and when used as a topcoat, preferably the dry film thickness is about 0.8 to 3.0 mils (20.6 to 76.2$\mu$).

After the application of the coating material to the plastic substrate, the coated substrate is heated to cure the coating material or cure the coating layers of a basecoat-clearcoat system. In some instances, simply air drying the coating composition will be sufficient. In the curing operation, organic solvents and/or water are driven out of the deposited film and the film-forming materials of the coating composition are crosslinked with the aid of the crosslinking resins present. The heating or curing operation is usually carried out at a temperature in the range of from about 160° F. to 350° F. (71° C. to 177° C.), preferably from about 235° F. to 275° F. (113° C. to 132° C.), usually at a temperature that is below the melting point of the plastic substrate on to which the coating composition has been applied.

When the claimed coating composition is used preferably as a primer, subsequent topcoats such as conventional basecoat-clearcoat composites or conventional monocoat topcoats can be applied to the cured primer film. Optionally, when the claimed coating composition is used as a basecoat, a subsequent conventional clearcoat can be applied to the dried or cured basecoat film. Usually, when the claimed coating composition is an organic solvent-based basecoat, the deposited basecoat film is flashed at ambient conditions for 1 to 5 minutes before the clearcoat is applied "wet on wet", then the basecoat-clearcoat composite is cured as detailed above. Generally, when the claimed coating composition is an aqueous-based basecoat, the deposited basecoat film is at least partially dried before the subsequent clearcoat is applied. By "partially dried" is meant that most, if not all, of the water has been driven from the deposited basecoat film so that preferably the weight percent solids of the partially dried deposited film has risen to at least 90 percent. This is usually accomplished by heating or simply air drying the basecoat film, usually from 1 to 5 minutes at about 100° F. to 250° F. (39° C. to 121° C.), and then the basecoat clearcoat composite is cured as detailed above.

The invention will be further described by reference to the following examples which are presented for the purpose of illustration only and are not intended to limit the scope of the invention.

EXAMPLES

The following are examples of liquid coating compositions of this invention, the methods of preparing and using the same, and the comparison of the claimed coating composition with a commercial adhesion promoter and primer, a commercial adhesion promoter and basecoat-clearcoat, and a commercial water-based primer.

Terms and abbreviations used in the following examples have the following meanings:

pbw means parts by weight.

DFT means dry film thickness in mils.

Tricut Adhesion refers to adhesion of the cured film to the TPO substrate according to Ford laboratory test method BI106-I using Nichiban tape. The value reported is the percent adhesion loss after four tape pulls.

Solvent Soak means resistance in minutes of the cured film to "lifting" from the scribed coated substrate after immersion in a 50/50 mixture (by volume) of toluene and Varnish Makers and Painters (VM&P) naptha.

Adhesion-H refers to adhesion of the cured film to the substrate after 240 hours in a constant humidity cabinet operating at 100 percent relative humidity and 37.8° C. as defined in American Society of Testing Materials (ASTM) 3359-B. A rating of 100 means complete loss of adhesion, and a rating of 0 means no loss of adhesion.

Adhesion-I refers to adhesion of the cured film to the substrate initially without further conditioning or exposure as defined in ASTM 3359-B standard test. A rating of 100 means complete loss of adhesion, and a rating of 0 means no loss of adhesion.

Thermal Shock is an indication that the coating passed (P) or failed (F) the paint adhesion test as described in the Ford laboratory test method BI7-5. The test involves immersion of a coated panel in water at 40° C. for four hours, followed immediately by a freezing cycle at −30° C. for three hours. After the freeze cycle, the panel is inscribed with an "X" and blasted with high pressure steam for at least 30 seconds. The panel is then inspected for loss of coating adhesion.

Example I

This example illustrates the preparation of two thermosetting solvent-based primer compositions according to the present invention, the properties of a resultant cured primer film on TPO, and a comparison to a commercial primer system using an adhesion promoter. The ingredients below were mixed together in the order listed under agitation in a suitable container.

| Composition | Primer Coating #1 | Primer Coating #2 |
|---|---|---|
| Xylene | 34 g | 34 g |
| Toluene | 10 g | 10 g |
| CYMEL 1156[1] | 26 g | 26 g |
| TINUVIN 328[2] | 1 g | 1 g |
| BYK 300[3] | .03 g | .03 g |
| Dodecylbenzene sulfonic acid | 1.8 g | 1.8 g |
| KRATON G1726X[4] | 7 g | 7 g |
| HPVM-2203[5] | 20 g | 10 g |
| Acrylic Grind Resin[6] | 7.1 g | 7.1 g |
| Polyester Polyol[7] | 9.4 g | 9.4 g |
| Oxohexyl acetate | 13 g | 13 g |
| n-propanol | 3.2 g | 3.2 g |
| CYMEL 1130[8] | 4.0 g | 4.0 g |
| PRINTEX XE-2[9] | 2.4 g | 2.4 g |
| Oxohexyl acetate | 14.1 g | 14.1 g |
| DOWANOL DPMA[10] | 4.7 g | 4.7 g |
| Polyester-urethane polyol[11] | 13.7 g | 13.7 g |

-continued

| Composition | Primer Coating #1 | Primer Coating #2 |
|---|---|---|
| Silica flatting agent[12] | 6.5 g | 6.5 g |
| Acrylic polyol[13] | 27 g | 14.3 g |
| Polyester polyol[7] | — | 21 g |

[1]Aminoplast resin commercially available from American Cyanamid Company.
[2]Substituted benztriazole UV light stabilizer commercially available from Ciba-Geigy Corporation.
[3]A methyl alkyl polysiloxane available from Byk Chemie USA.
[4]A styrene-ethylene-butylene-styrene block copolymer commercially available from Shell Chemical Company.
[5]A hydrogenated polybutadiene diol polymer containing terminal hydroxyl groups commercially available from Shell Chemical Company.
[6]A reaction product of styrene, butyl methacrylate, ethyl hexylacrylate, methyl methacrylate, and hydroxyethylacrylate.
[7]A reaction product of 65 pbw of 2,2,4-trimethyl-1,3-pentanediol and 35 pbw of hexahydrophthalic anhydride, having a hydroxyl value of 234 based on weight of solution resin.
[8]Aminoplast resin commercially available from American Cyanamid Company.
[9]A conductive carbon black pigment commercially available from DeGussa Corporation.
[10]Dipropylene glycol monomethyl ether acetate commercially available from Dow Chemical.
[11]A reaction product of 24 pbw neopentyl glycol, 44.3 pbw hexahydrophthalic anhydride, 27.1 pbw 1,6-hexanediol, and 4.6 pbw 2,2,4-dicyclohexylmethylene diisocyanate having a hydroxyl value of 183 based on weight of solid resin.
[12]A wax treated amorphous silica commercially available from DeGussa Corporation.
[13]A reaction product of hydroxypropylene, styrene, butyl acrylate, butylmethacrylate, methylmethacrylate and acrylic acid having a Mp of 8000, a Mw of 9000, and a Mn of 3500 and a hydroxyl value of 270 based on weight of solid resin.

Primers 1 and 2 were spray applied at ambient conditions directly to test plaques of TPO (HIMONT RTA 3263 and D&S D/F 880 commercially available from Standard Plaque Inc.) to a dry film thickness of 1.2 mils (30.5$\mu$). The resulting films were cured at 265° F. (129° C.) for 30 minutes. The test plaques, labeled as D/F 880 and RTA 3263, were then evaluated with the results listed in Table I below.

TABLE I

| Composition | DFT (mils) | Tricut Adhesion | | Solvent Soak (min) | | Adhesion-H | | Thermal Shock | |
|---|---|---|---|---|---|---|---|---|---|
| | | D/F 880 | RTA 3263 | D/F 880 | RTA 3263 | D/F 880 | RTA 3263 | D/F 880 | RTA 3263 |
| Primer 1 | 1.2 | 0 | 0 | 180 | 180 | 0 | 0 | P | P |
| Primer 2 | 1.2 | 0 | 0 | 180 | 180 | 0 | 0 | P | P |
| MPP 4110 + HAP Primer[1] | .25/1.2 | 0 | 0 | 16 | 48 | 0 | 0 | P | P |

[1]Thermoplastic polyolefin test substrates, D/F 880 and RTA 3263, were prepared for testing by first spray applying a solvent-borne chlorinated polyolefin containing adhesion promoter MPP 4110, available from PPG Industries Inc., to the substrates at a thickness of 0.25 mils (6.4 $\mu$). The cast film was dried at ambient conditions for two minutes. The adhesion promoter film was thenimmediately coated with 1.2 mils (30.5 $\mu$) of a solvent-based elastomeric high solids primer, HAP 9270R, commercially available from PPG Industries, Inc. The resultant composite coating was cured at 265° F. (129° C.) for 30 minutes.

Example II

This example illustrates the preparation of two thermosetting solvent-based basecoat compositions according to the present invention, the properties of a resultant cured primer film on TPO and a comparison to a commercial basecoat system using an adhesion promoter. The ingredients below were mixed together in the order listed under agitation in a suitable container.

| Coating Composition | Basecoat #1 | Basecoat #2 |
|---|---|---|
| Methyl isobutyl ketone | 4 g | 4 g |
| Methyl-n-amyl ketone | 13 g | 13 g |
| Toluene | 11 g | 11 g |
| Xylene | 3 g | 3 g |
| TINUVIN 328 | 1 g | 1 g |
| CYMEL 1130[1] | — | 40 g |
| CYMEL 1156 | 40 g | — |
| HCM-2555[2] | 19 g | 19 g |
| Dodecylbenzenesulfonic acid | 1.4 g | 1.4 g |
| Acrylic grind resin[3] | 13 g | 13 g |
| n-butyl acetate | 15.3 g | 15.3 g |
| MONARCH 1300[4] | 3.0 g | 3.0 g |
| CYMEL 1130 | 6.7 g | 6.7 g |
| HPVM-2203 | 10.0 g | 15 g |
| Polyester polyol[5] | 11.1 g | 16.7 g |
| Polyester polyol[6] | 23.1 g | — |
| Polyester polyol[7] | — | 13.1 g |

[1]Aminoplast crosslinking agent available from American Cyanamid Company.
[2]A polymeric microparticles prepared in accordance with U.S Pat. No. 4,147,688, Example II.
[3]A reaction product of styrene, 2-ethylhexyl acrylate, butyl methacrylate, methyl methacrylate, hydroxy ethyl acrylate, methacrylic acid, and acrylic acid.
[4]A high color black pigment available from Cabot Chemical.
[5]See footnote 7 of Bxample I above.
[6]A reaction product of 50 pbw 1,6 hexanediol, 30.5 pbw hexahydrophthalic anhydride, and 19.5 pbw adipic acid, having a hydroxyl value of 128 based on weight of resin solids.
[7]A reaction product of 42.5 pbw neopentyl glycol and 57.5 pbw hexahydrophthalic anhydride, having a hydroxyl value of 301 based on weight of resin solids.

Basecoats 1 and 2 were spray applied at ambient conditions directly to test plaques of TPO, RTA 3263 and D&S D/F 880, to a dry film thickness of 1.0 mils (25.4$\mu$). After flashing one minute at ambient temperature, a high solids solvent-based clearcoat, UCC 1001W commercially available from PPG Industries, Inc., was spray applied wet-on-wet to a thickness of 2.3 mils (58.4$\mu$) over the basecoated TPO test plaques. The resulting films were cured at 265° F. (129° C.) for 30 minutes. The test plaques, labeled as D/F 880 and RTA 3263, were then evaluated with the results listed in Table II below.

TABLE II

| Composition | DFT (mils) | Tricut Adhesion % | | Solvent Soak (min) | | Adhesion-H % | | Thermal Shock | |
|---|---|---|---|---|---|---|---|---|---|
| | | D/F 880 | RTA 3263 | D/F 880 | RTA 3263 | D/F 880 | RTA 3263 | D/F 880 | RTA 3263 |
| Basecoat 1 | 1.0 | 0 | 0 | 240 | 240 | 0 | 0 | P | P |
| Basecoat 2 | 1.0 | 0 | 0 | 240 | 240 | 0 | 0 | P | P |
| MPP 4110 + Base/Clear[1] | .25/1.0 | 0 | 0 | 60 | 28 | 0 | 0 | P | P |

[1]Same as for TABLE I above except the adhesion promoter film was then immediately coated with 1.0 mils (25.4 $\mu$) of a high solids elastomeric black basecoat CBC 8555C, commercially available from PPG Industries, Inc. The black pigmented basecoat was flashed at ambient conditions for 60 seconds and a clear coating composition UCC 1001W, commercially available from PPG Industries Inc., was applied wet-on-wet to the continuous film of basecoat at a thickness of 2.3 mils (58.4 $\mu$). The resultant composite coating was cured at 265° F. (129° C.) for 30 minutes.

Example III

This example illustrates the preparation of three thermosetting water-based coating compositions according to the present invention and the properties of a resultant cured film directly on TPO. The ingredients below were mixed together in the order listed under agitation in a suitable container.

| Composition | #1 | #2 | #3 |
|---|---|---|---|
| m-pyrol | 10 | 10 | 10 |
| Hexyl CELLOSOLVE[1] | 10 | 10 | 10 |
| Dodecylbenzenesulfonic acid | 2 | 2 | 2 |
| HPVM-2203 | 15 | 10 | 20 |
| Polyester polyol[2] | 10 | 10 | 10 |
| CYMEL 1156 | 20 | 20 | 20 |
| Diisopropanol amine, 50% in water | 2 | 2 | 2 |
| Acrylic latex[3] | 135 | 147 | 123 |
| Pigment dispersion[4] | 30 | 30 | 30 |
| Deionized water | 25 | 25 | 25 |

[1]Ethylene glycol monohexyl ether commercially available from Union Carbide Chemicals and Plastics Co., Inc.
[2]A reaction product of 42.5 pbw neopentyl glycol and 57.5 pbw hexahydrophthalic anhydride, having a hydroxyl value of 301 based on weight of resin solids.
[3]Prepared according to U. S. Pat. No. 5,071,904, Example I.
[4]Carbon black dispersion consisting of 6.33 pbw of Monarch 1300 from Cabot Chemical in an water reducible acrylic containing 34.98% n-butylacrylate, 29.99% styrene, 17.99% n-butylmethacrylate, and 8.52% 2-hydroxyethylacrylate; 53.7 pbw deionized water; 6.17 pbw of propylene glycol monomethy ether; 7.97 pbw butyl carbitol; 6.17 pbw propylene glycol propyl ether; 1.67 pbw dimethyl ethanol amine; and 0.152 pbw odorless mineral spirits.

Compositions 1, 2, and 3 were spray applied as primers at ambient conditions directly to test plaques of TPO (HIMONT RTA 3263 and D&S D/F 880 commercially available from Standard Plaque Inc.) to a dry film thickness of 1.0 mils (25.4µ). The resulting films were cured at 265° F. (129° C.) for 30 minutes. The test plaques, labeled as D/F 880 and RTA 3263, were then evaluated with the results listed in the following table.

Compositions 1, 2, and 3 were also spray applied as basecoats at ambient conditions directly to test plaques of TPO, RTA 3263 and D&S D/F 880, to a dry film thickness of 1.0 mils (25.4µ). The basecoats were dried for six minutes at 180° F. (82° C.) to remove the water from the film, then a high solids solvent-based clearcoat, UCC 1001W commercially available from PPG Industries, Inc., was spray applied to a thickness of 2.3 mils (58.4µ) over the basecoated TPO test plaques. The resulting films were cured at 265° F. (129° C.) for 30 minutes. The test plaques, labeled as D/F 880 and RTA 3263, were then evaluated with the results listed in Table III below.

TABLE III

| | | Solvent Soak* | | Adhesion-I | | Adhesion-H | |
|---|---|---|---|---|---|---|---|
| Composition | DFT | D/F 880 | RTA 3263 | D/F 880 | RTA 3263 | D/F 880 | RTA 3263 |
| Primer #1 | 1.0 | 60+ | 60+ | 0 | 0 | 0 | 0 |
| Primer #2 | 1.0 | 60+ | 60+ | 0 | 0 | 0 | 0 |
| Primer #3 | 1.0 | 60+ | 60+ | 0 | 0 | 0 | 0 |
| Primer control[1] | 1.0 | <5 | <5 | 100 | 100 | 100 | 100 |
| Basecoat #1 | 1.0 | 60+ | 60+ | 0 | 0 | 0 | 0 |
| Basecoat #2 | 1.0 | 60+ | 60+ | 0 | 0 | 0 | 0 |
| Basecoat #3 | 1.0 | 60+ | 60+ | 0 | 0 | 0 | 0 |
| Basecoat control[2] | 1.0 | <5 | <5 | 100 | 100 | 100 | 100 |

[1]A water-based primer, FWP 9471, commercially available from PPG Industries, Inc., was spray applied at ambient conditions directly to test plaques of TPO (HIMONT RTA 3263 and D&S D/F 880) to a dry film thickness of 1.0 mils (25.4 µ). The resulting films were cured at 265° F. (129° C.) for 30 minutes.

TABLE III-continued

| | | Solvent Soak* | | Adhesion-I | | Adhesion-H | |
|---|---|---|---|---|---|---|---|
| Composition | DFT | D/F 880 | RTA 3263 | D/F 880 | RTA 3263 | D/F 880 | RTA 3263 |

[2]A water-based primer, FWP 9471, commercially available from PPG Industries, Inc., was spray applied as a basecoat at ambient conditions directly to test plaques of TPO (HIMONT RTA 3263 and D&S D/F 880) to a dry film thickness of 1.0 mils (25.4 µ). The basecoats were force dried for 6 minutes at 180° F. (82° C.) to remove the water from the film, then a high solids solvent-based clearcoat, UCC 1001W commercially available from PPGIndustries, Inc., was spray applied to a thickness of 2.3 mils (58.4 µ) over the basecoated TPO test plaques. The resulting films were cured at 265° F. (129° C.) for 30 minutes.
*Results are reported as minutes until failure. A result of 60+ means that the test was discontinued after 60 minutes and that the coated test plaque exhibited no adhesion loss or lifting of the film.

Example IV

This example illustrates the preparation of thermosetting clear compositions in solvents with varying solubility parameters and the properties of a resultant cured film on TPO. The ingredients below were mixed together in the order listed under agitation in a suitable container until clear:

| Ingredients | Total Weight in Grams |
|---|---|
| Xylene | 9.0 |
| TINUVIN 328[1] | 3 |
| CYMEL 1156[2] | 40 |
| BYK 300[3] | .03 |
| Dodecylbenzene sulfonic acid | 1.8 |
| Polybutyl acrylate[4] | 0.6 |
| Polyester Polyol[5] | 28 |
| Acrylic Polyol[6] | 21.4 |
| Polyester Polyol[7] | 5.6 |
| Total: | 109.43 |

[1]Substituted benzotriazole UV-light stabilizer commercially available from Ciba-Geigy Corporation.
[2]Aminoplast resin available from American Cyanamid Company.
[3]A methyl alkyl polysiloxane available from Byk Chemie USA.
[4]A flow control agent having a $M_w$ of about 6700 and a $M_n$ of about 2600 made in xylene at 60% non-volatile.
[5]A reaction product of 65 pbw of 2,2,4-trimethyl-1,3-pentane diol and 35 pbw of hexahydrophthalic anhydride, having a hydroxyl value of 234 based on weight of solid resin.
[6]A reaction product of hydroxypropyl acrylate, styrene, butyl acrylate, butylmethacrylate, methyl methacrylate and acrylic acid having a $M_p$ of 8000, a $M_w$ of 9000 and a $M_n$ of 3500 and a hydroxyl value of 270 based on weight of solid resin.
[7]A reaction product of 42.5 pbw neopentyl glycol and 57.5 pbw hexahydrophthalic anhydride having a hydroxyl value of 301 based on weight of solid resin.

First, 125 pbw of each of the solvents reported in Table IV below were added to the above basemix individually to make 16 new compositions. Finally, 15 pbw of HPVM-2203, a hydroxyl terminated polybutadiene from Shell Chemical Company, was added to each composition. Each of the 16 compositions were spray applied at ambient conditions directly to test plaques of TPO (HIMONT RTA 3263) to a dry film thickness of 1.0 mils (25.4µ). The resulting films were cured at 265° F. (129° C.) for 30 minutes. The appearance of the test plaques were then evaluated. The utility of a coating composition was considered excellent when a coating formed a clear film free of gelled particles on the test plaque. The utility of a coating composition was considered poor when a coating formed a film containing insoluble gelled matter that appeared very rough on the test plaque. The results are listed in Table IV below.

TABLE IV

| Solvent | Utility* | $Sp_o$ | $Sp_h$ | $Sp_p$ | $Sp_d$ |
|---|---|---|---|---|---|
| xylene | excellent | 9.9 | 1.2 | 0.9 | 9.8 |
| butyl acetate | excellent | 8.5 | 3.1 | 1.8 | 7.7 |
| methyl isobutyl ketone | excellent | 8.3 | 2.0 | 3.0 | 7.5 |
| toluene | excellent | 8.9 | 1.0 | 0.7 | 8.8 |
| methyl amyl ketone | excellent | 9.7 | 4.9 | 2.7 | 7.9 |
| Aromatic 150[1] | excellent | 9.0 | 1.5 | 0.5 | 8.9 |
| Aromatic 100[2] | excellent | 9.0 | 1.5 | 0.5 | 8.9 |
| isopropanol | poor | 11.5 | 8.0 | 3.0 | 7.7 |
| methyl ethyl ketone | poor | 9.3 | 2.5 | 4.4 | 7.8 |
| n-propanol | poor | 12.0 | 8.5 | 3.3 | 7.8 |
| ethyl acetate | excellent | 8.9 | 3.5 | 2.6 | 7.7 |
| butanol | poor | 11.3 | 7.7 | 2.8 | 7.8 |
| diisobutyl ketone | excellent | 8.2 | 2.0 | 1.8 | 7.8 |
| heptane | poor | 7.5 | 0 | 0 | 7.5 |
| mineral spirits | poor | 7.7 | 0 | 0 | 7.7 |

[1]Commercially available from Exxon Chemicals.
[2]Commercially available from Exxon Chemicals.
*Describes the performance of the solvent in the coating composition. Excellent refers to a coating that dries clear and is free of gelled particles. Poor refers to a coating with insoluble gelled matter that appears very rough on a coated substrate.

What is claimed is:

1. A plastic article formed from a plastic material selected from the group consisting of thermoplastic olefins and reaction injected molding urethanes, the plastic article being coated with a film of a primer composition deposited directly onto a surface of the plastic article without the aid of flame or corona pretreatment, or the use of an adhesion promoter or tie coat, the primer composition comprising:

(a) from 5 to 45 percent by weight of resin solids of substantially saturated polyhydroxylated polydiene polymer having terminal hydroxyl groups;
    (b) from 10 to 50 percent by weight of resin solids of aminoplast crosslinking material;
    (c) from 5 to 85 percent by weight of resin solids of a film-forming resin selected from the group consisting of polyesters, acrylics, polyurethanes, and copolymers and mixtures thereof; and
    (d) solvent composition, wherein the film is exposed to air to form a dried film which has a thickness of 0.5 to 2.0 mils (12.7 to 50.8μ).

2. The plastic article according to claim 1, wherein the primer composition further comprises at least one pigment.

3. The plastic article according to claim 1, wherein the substantially saturated polyhydroxylated polydiene polymer of the primer composition is a substantially saturated polybutadiene diol polymer.

4. The plastic article according to claim 1, wherein the substantially saturated polyhydroxylated polydiene polymer is present in the primer composition in an amount of from 10 to 40 percent by weight of resin solids.

5. The plastic article according to claim 1, wherein the substantially saturated polyhydroxylated polydiene polymer is present in the primer composition in an amount of from 10 to 20 percent by weight of resin solids.

6. The plastic article according to claim 1, wherein the solvent is an organic solvent and the film-forming resin is present in the primer composition in an amount of 15 to 75 percent by weight of resin solids.

7. The plastic article according to claim 1, wherein the aminoplast crosslinking material is present in an amount of 15 to 50 percent by weight of resin solids.

8. The plastic article according to claim 1, wherein the solvent is water and the percent by weight solids content is about 20 to about 50 percent.

9. The plastic article according to claim 1, wherein the solvent is an organic solvent and the percent by weight solids content is about 30 to about 70 percent.

10. The plastic article according to claim 1, wherein the pH of the primer composition ranges from 7 to 11.

11. A plastic article formed from a plastic material selected from the group consisting of thermoplastic olefins and reaction injected molding urethanes, the plastic article being coated with a film of a basecoat composition deposited directly onto a surface of the plastic article without the aid of flame or corona pretreatment, or the use of an adhesion promoter or tie coat, the basecoat composition comprising:

(a) from 5 to 45 percent by weight of resin solids of substantially saturated polyhydroxylated polydiene polymer having terminal hydroxyl groups;
    (b) from 10 to 50 percent by weight of resin solids of aminoplast crosslinking material;
    (c) from 5 to 85 percent by weight of resin solids of a film-forming resin selected from the group consisting of polyesters, acrylics, polyurethanes, and copolymers and mixtures thereof; and
    (d) solvent composition, wherein the film is exposed to air to form a dried film which has a thickness of 0.2 to 1.5 mils (5.1 to 38.1μ).

12. The plastic article according to claim 11, wherein the basecoat composition further comprises at least one pigment.

13. The plastic article according to claim 11, wherein the substantially saturated polyhydroxylated polydiene polymer of the basecoat composition is a substantially saturated polybutadiene diol polymer.

14. The plastic article according to claim 11, wherein the substantially saturated polyhydroxylated polydiene polymer is present in the basecoat composition in an amount of from 10 to 40 percent by weight of resin solids.

15. The plastic article according to claim 11, wherein the substantially saturated polyhydroxylated polydiene polymer is present in the basecoat composition in an amount of from 10 to 20 percent by weight of resin solids.

16. The plastic article according to claim 11, wherein the solvent is an organic solvent and the film-forming resin is present in the basecoat composition in an amount of 15 to 75 percent by weight of resin solids.

17. The plastic article according to claim 11, wherein the aminoplast crosslinking material is present in an amount of 15 to 50 percent by weight of resin solids.

18. The plastic article according to claim 11, wherein the solvent is water and the percent by weight solids content is about 20 to about 50 percent.

19. The plastic article according to claim 11, wherein the solvent is an organic solvent and the percent by weight solids content is about 30 to about 70 percent.

20. The plastic article according to claim 11, wherein the pH of the basecoat composition ranges from 7 to 11.

21. A coated plastic article formed from a plastic material selected from the group consisting of thermoplastic olefins and reaction injected molding urethanes, the plastic article being coated with a film of a topcoat composition deposited directly onto a surface off the plastic article without the aid of flame or corona pretreatment, or the use of an adhesion promoter or tie coat, the topcoat composition comprising:

(a) from 5 to 45 percent by weight of resin solids of substantially saturated polyhydroxylated polydiene polymer having terminal hydroxyl groups;
    (b) from 10 to 50 percent by weight of resin solids of aminoplast crosslinking material;

(c) from 5 to 85 percent by weight of resin solids of a film-forming resin selected from the group consisting of polyesters, acrylics, polyurethanes, and copolymers and mixtures thereof; and (d) solvent composition, wherein the film is exposed to air to form a dried film which has a thickness of 0.8 to 3.0 mils (20.6 to 76.2µ).

22. The plastic article according to claim 21, wherein the topcoat composition further comprises at least one pigment.

23. The plastic article according to claim 21, wherein the substantially saturated polyhydroxylated polydiene polymer of the topcoat composition is a substantially saturated polybutadiene diol polymer.

24. The plastic article according to claim 21, wherein the substantially saturated polyhydroxylated polydiene polymer is present in the topcoat composition in an amount of from 10 to 40 percent by weight of resin solids.

25. The plastic article according to claim 21, wherein the substantially saturated polyhydroxylated polydiene polymer is present in the topcoat composition in an amount of from 10 to 20 percent by weight of resin solids.

26. The plastic article according to claim 21, wherein the solvent is an organic solvent and the film-forming resin is present in the topcoat composition in an amount of 15 to 75 percent by weight of resin solids.

27. The plastic article according to claim 21, wherein the aminoplast crosslinking material is present in an amount of 15 to 50 percent by weight of resin solids.

28. The plastic article according to claim 21, wherein the solvent is water and the percent by weight solids content is about 20 to about 50 percent.

29. The plastic article according to claim 21, wherein the solvent is an organic solvent and the percent by weight solids content is about 30 to about 70 percent.

30. The plastic article according to claim 21, wherein the pH of the topcoat composition ranges from 7 to 11.

* * * * *